(12) United States Patent
Kobayashi et al.

(10) Patent No.: US 6,234,869 B1
(45) Date of Patent: May 22, 2001

(54) MACHINE CONTROL GAGE SYSTEM

(75) Inventors: Hiroyuki Kobayashi; Haruo Shibata, both of Mitaka (JP)

(73) Assignee: Tokyo Seimitsu Co., Ltd., Tokyo (JP)

( * ) Notice: Subject to any disclaimer, the term of this patent is extended or adjusted under 35 U.S.C. 154(b) by 0 days.

(21) Appl. No.: 09/450,774

(22) Filed: Nov. 30, 1999

(51) Int. Cl.[7] .................................................. B24B 49/00
(52) U.S. Cl. .................................. 451/5; 451/10; 451/11; 451/21; 451/410
(58) Field of Search .............................. 451/5, 6, 8, 9, 451/10, 11, 21, 22, 410

(56) References Cited

U.S. PATENT DOCUMENTS

| | | | |
|---|---|---|---|
| 4,471,580 | * | 9/1984 | Robillard ............................ 451/21 |
| 4,802,311 | * | 2/1989 | Scheder et al. ..................... 451/22 |
| 5,103,596 | * | 4/1992 | Fujii et al. .......................... 451/10 |
| 5,148,637 | * | 9/1992 | Byron ................................. 451/11 |
| 5,741,172 | * | 4/1998 | Trionfetti et al. .................... 451/9 |
| 5,876,265 | * | 3/1999 | Kojima .............................. 451/10 |

FOREIGN PATENT DOCUMENTS

| | | |
|---|---|---|
| 6-106453 | 4/1994 | (JP) . |
| 6-335843 | 12/1994 | (JP) . |
| 11-10482 | 1/1999 | (JP) . |

* cited by examiner

Primary Examiner—Eileen P. Morgan
(74) Attorney, Agent, or Firm—Oliff & Berridge, PLC

(57) ABSTRACT

The record of changes in the size of a workpiece, which is measured by a gage head during grinding, is graphed on a color LCD of a control part. It is therefore possible to know if there is an abrupt change or no change in the size of the workpiece during the grinding just by looking at the graph. Thus, the sharpness of a grinding wheel can easily be judged during the grinding.

4 Claims, 10 Drawing Sheets

F I G. 1
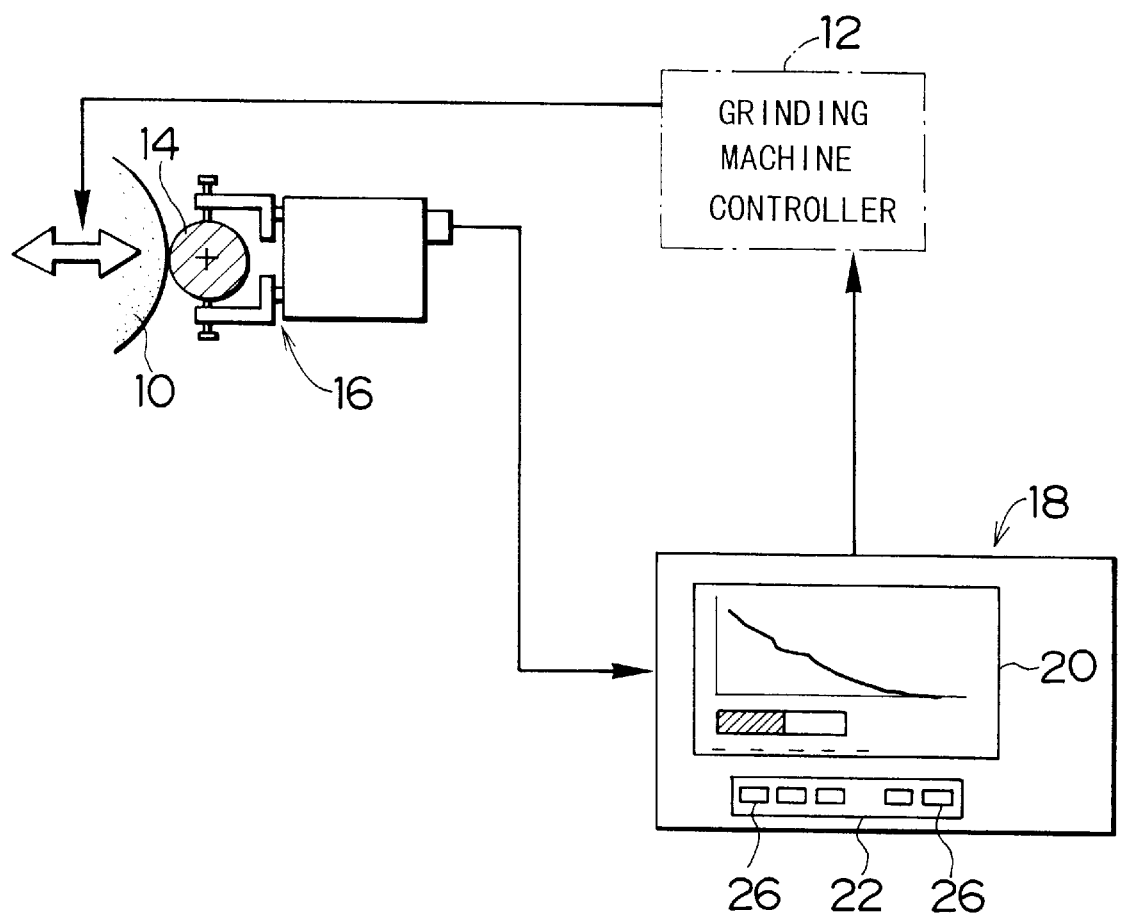

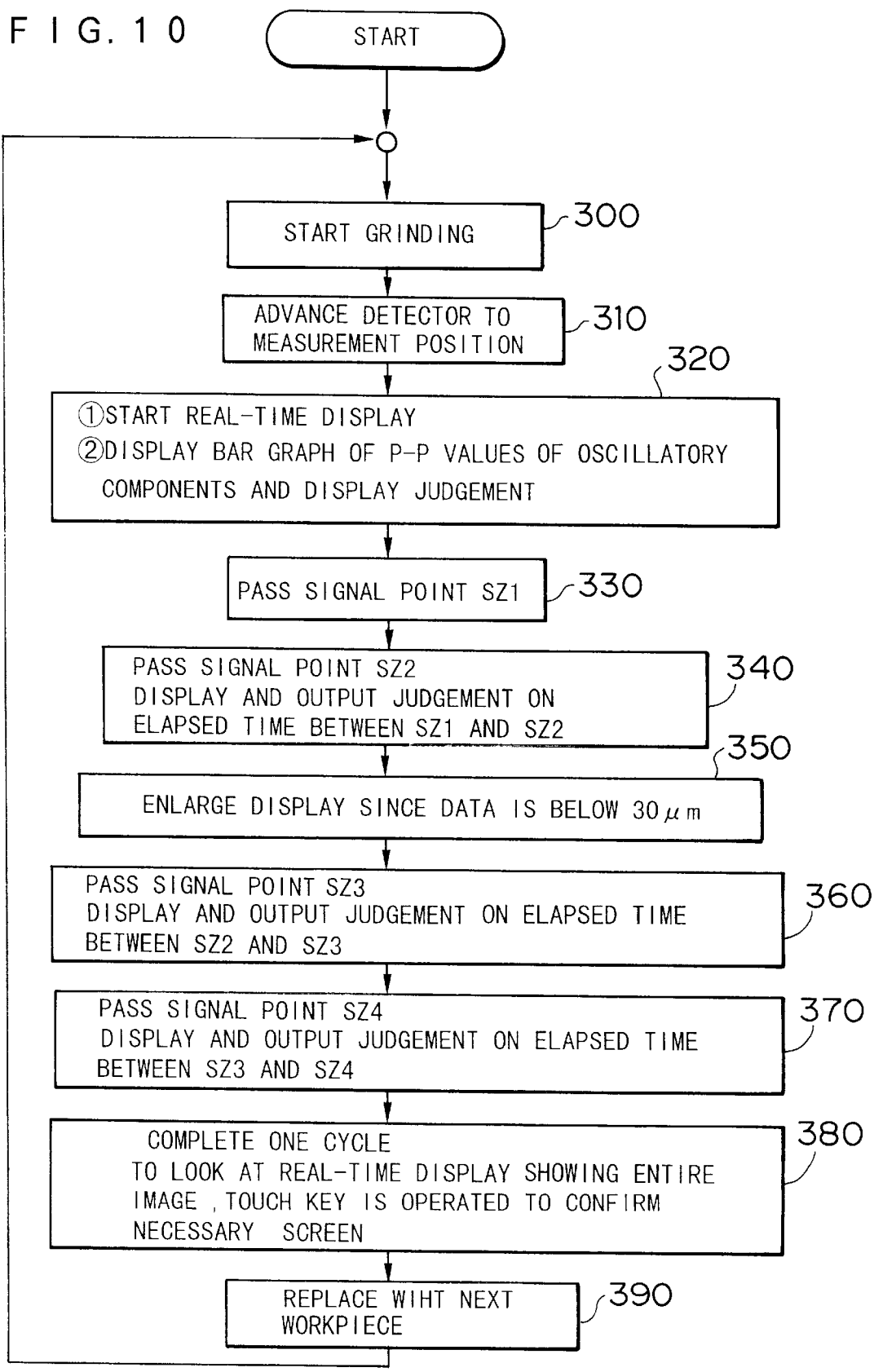

MACHINE CONTROL GAGE SYSTEM

BACKGROUND OF THE INVENTION

1. Field of the Invention

The present invention relates generally to a machine control gage system, and more particularly to a machine control gage system that measures the size of a workpiece during machining by a machine tool and controls the machine tool so that the size of the products can be uniform.

2. Description of Related Art

An in-process machine control gage system is used for a grinding machine such as a cylinder grinding machine in order to improve machining accuracy and the automation productivity. The machine control gage system measures the size of the workpiece during the machining and controls the grinding machine in real-time to thereby achieve the uniform products.

The size of the workpiece at grinding steps (e.g., a rough-grinding step, a fine-grinding step and a spark-out grinding step) is displayed on a display unit such as a meter and a bar-graph display provided in an in-process control part of the machine control gage system.

The conventional machine control gage system only determines the current size of the workpiece during the grinding, and thus, it is difficult to detect the abnormal status of the grinding and judge the sharpness of the grinding wheel. In the conventional machine control gage system, the abnormal status of the grinding is often missed. Moreover, it requires a great deal of skill to determine when the grinding wheel should be dressed.

SUMMARY OF THE INVENTION

In view of the foregoing, it is an object of the present invention to provide a machine control gage system that can easily detect the abnormal status of the grinding and judge the sharpness of the grinding wheel.

To achieve the above-mentioned object, the present invention is directed to a machine control gage system, comprising: a measuring device that detects changes in the size of a workpiece ground by a machine tool, and outputs electric signals representing the changes in the size of the workpiece; a controller that monitors the changes in the size of the workpiece in accordance with the electric signals outputted from the measuring device, and outputs a signal to control the machine tool when the workpiece reaches a predetermined size; and a display that displays a graph showing a record of the changes in the size of the workpiece in accordance with the electric signals outputted from the measuring device.

According to the present invention, the record of the changes in the size of the workpiece during the grinding is graphed on the display. It is therefore possible to know that there is an abrupt change or no change in the size of the workpiece during the grinding only by looking at the graph. Thus, the sharpness of the grinding wheel can be judged easily and the dressing time of the grinding wheel can be determined without a great deal of skill.

According to the present invention, the machine control gage system further comprises a first abnormality detector that monitors the changes in the size of the workpiece in accordance with the electric signals outputted from the measuring device, and outputs a first abnormality detection signal when a time elapsed for a predetermined change in the size of the workpiece is out of a predetermined allowable range.

The defects result from the decrease in the sharpness of the grinding wheel. The grinding time of the grinding wheel with the dull cutting edge is beyond the predetermined allowable range until the workpiece is ground by a certain feed amount, since the grinding wheel does not grind the workpiece and the workpiece is elastically deformed. With the dull cutting edge, the grinding feed amount is decreased during the fine grinding and the spark-out grinding, and consequently, the workpiece is ground by the elastic return force thereof, and the grinding amount is beyond the allowable range. To address these problems, the time required for a predetermined change in size is monitored in the present invention, so that whether the dressing for the grinding wheel is required can be determined automatically.

According to the present invention, the machine control gage system further comprises a second abnormality detector that monitors an amplitude of oscillatory components of the electric signals outputted from the measuring device, and outputs a second abnormality detection signal when the amplitude exceeds a predetermined allowable value. The defects resulting from the eccentricity of the workpiece, the inferior grinding wheel, the abrasive grains, the chips, the chatter, etc. can be detected by monitoring the amplitude of the electric signals outputted from the measuring device.

According to the present invention, the display displays a graph showing a record of the changes in the size of the workpiece in normal machining. Therefore, the sharpness of the grinding wheel can easily be checked in detail since the record of sizes in the normal machining and the record of sizes in the resent machining are displayed on the display.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein:

FIG. 1 is a view showing the structure of a cylinder grinding machine, to which a machine control gage system according to an embodiment of the present invention is applied;

FIG. 10 is a flow chart showing the measurement procedure of the machine control gage system.

DETAILED DESCRIPTION OF THE PREFERRED EMBODIMENT

Figure 2:
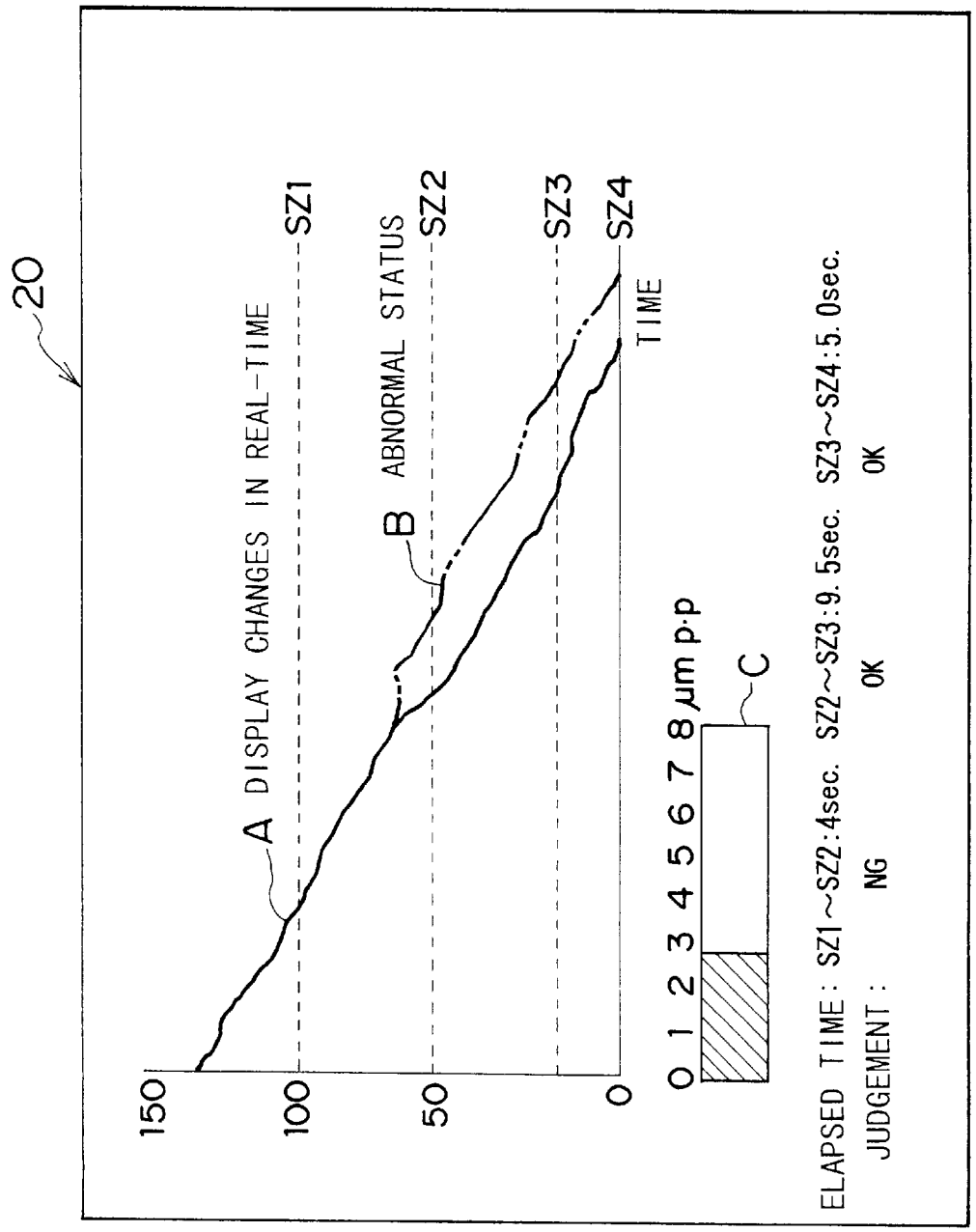
FIG. 2 is an explanation drawing showing measurement data, etc. displayed on a color LCD of a control part of the machine control gage system in FIG. 1.

This invention will be described in further detail by way of example with reference to the accompanying drawings.

FIG. 1 shows an example of a machine control gage system according to the present invention, which is applied to a cylinder grinding machine.

A grinding wheel 10 of the cylinder grinding machine is rotatably attached to a wheel spindle stock (not shown), and a grinding machine controller 12 controls the rotational speed of the grinding wheel 10 and the position of the wheel spindle stock. The machine control gage system comprises a gage head 16, which determines a change in the outer diameter of a workpiece 14, and a control part 18. The machine control gage system outputs a signal when the workpiece 14 corresponds to a predetermined size during the machining of the workpiece 14.

The gage head 16 is a two-point contact head, which employs an electric micrometer detector therein. The gage head 16 is attached to a table (not shown) of the grinding machine, and outputs an electric signal corresponding to the outer diameter of the workpiece 14.

The control part 18 is an in-process gage control part, which is capable of processing a variety of data. A color liquid crystal display (LCD) 20 and a touch panel 22 are provided at the front of the control part 18. As shown in FIG. 2, the record of the measurement data is graphed (e.g., as a graph A drawn with a solid line in FIG. 2). In the graph A, the vertical axis represents the machining allowance ($\mu$m) and the horizontal axis represents the elapsed time (sec). A graph B drawn with an alternate long and two short dashes line in FIG. 2 is a sample representing the record of the measurement data in the abnormal status.

The color LCD 20 displays the elapsed time in the rough grinding (SZ1–SZ2), the elapsed time in the fine grinding (SZ2–SZ3) and the elapsed time in the spark-out grinding (SZ3–SZ4), and the judgement results (OK or NG) are displayed below the displayed times. The color LCD 20 also displays a bar graph C, which indicates the peak-to-peak (P—P) value of the amplitude of the oscillatory components in the electric signal from the gage head 16.

Figure 3:
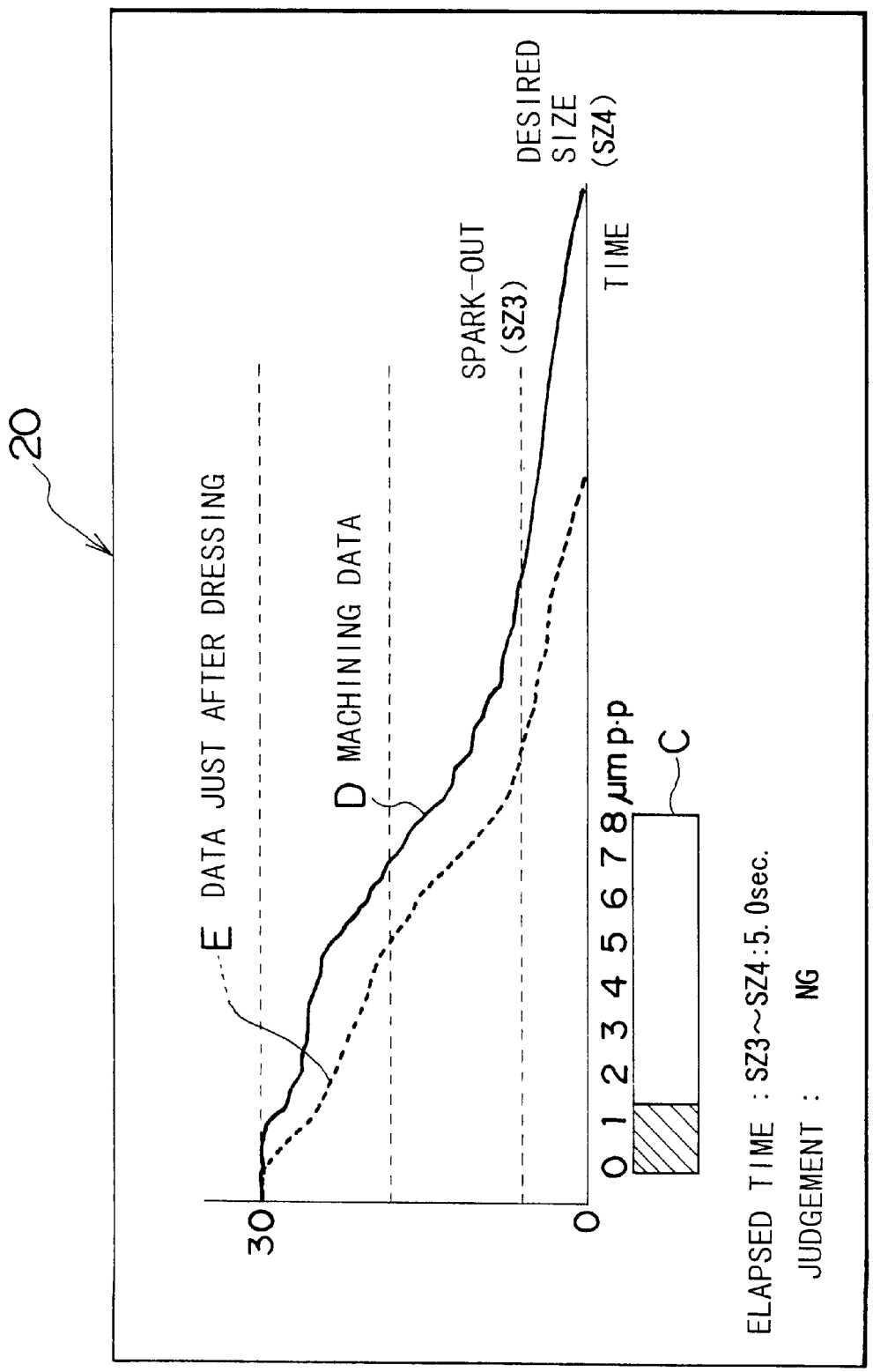
FIG. 3 is an explanation drawing showing the color LCD, which has been switched to show an enlarged picture.
Figure 4:
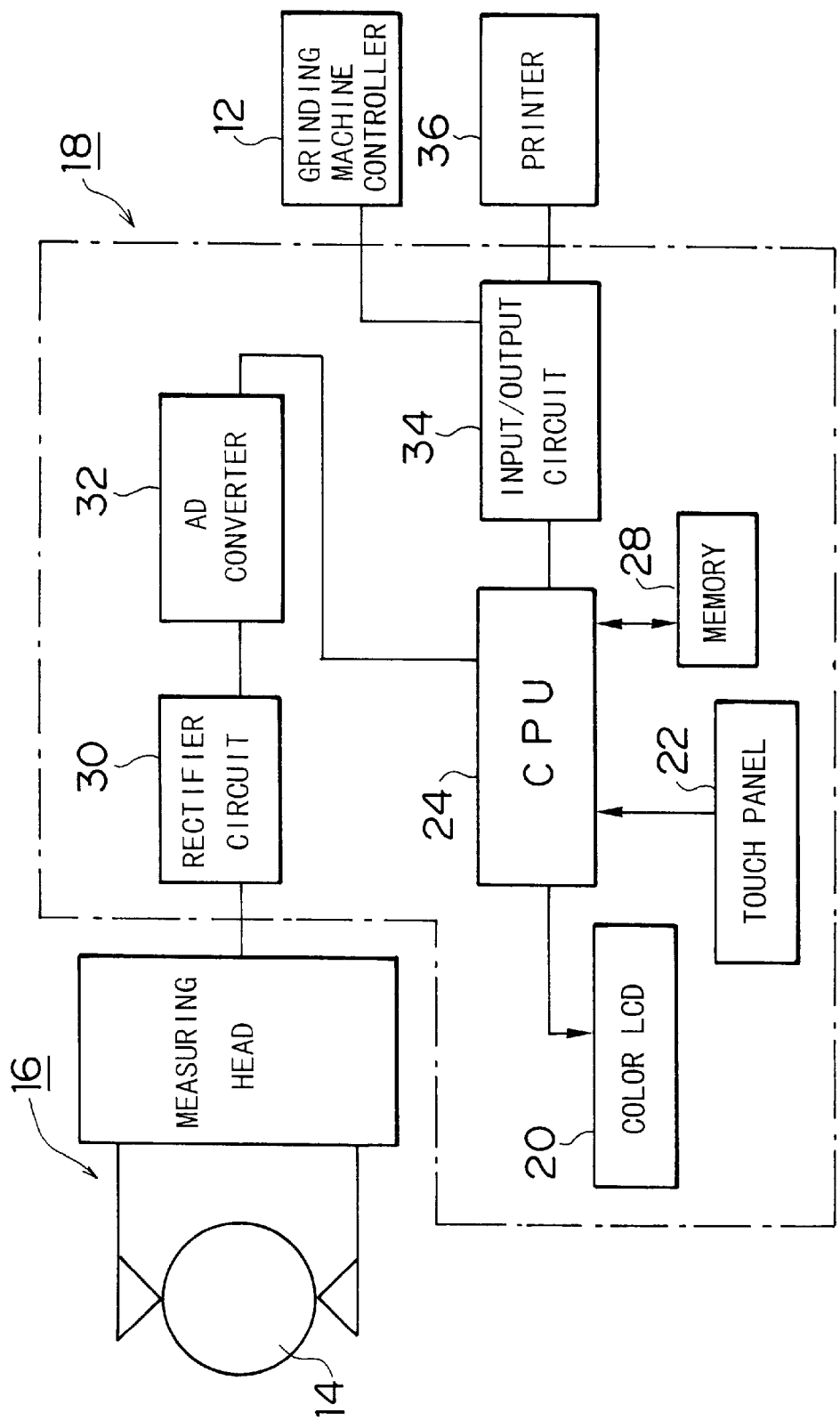
FIG. 4 is a block diagram showing the structure of the machine control gage system in FIG. 1.

When the machining allowance becomes less than 30 $\mu$m, a central processing unit (CPU) 24 of the control part 18 in FIG. 4 controls the color LCD 20 so that the picture in FIG. 2 can be switched to an enlarged picture in FIG. 3. The switch value is not restricted to 30 $\mu$m but can be set arbitrarily. A graph D drawn with a solid line in FIG. 3 shows the record of the actual measurement data, and a graph E drawn with a broken line in FIG. 3 shows the record of ideal data in the case that the machining is performed just after the dressing of the grinding wheel 10. The ideal data is previously stored, and is read and displayed with the graph D. Since the color LCD 20 displays the ideal data as well as the actual measurement data, it is possible to determine at first sight whether there is an error in the machining or not by comparing the ideal data and the actual measurement data. In FIG. 3, the color LCD 20 only shows the elapsed time in the spark-out grinding (SZ3–SZ4).

In FIG. 1, there are a number of buttons 26 on the touch panel 22. The operations of the buttons 26 previously store the machining allowance of the workpiece 14, the machining period for each step (the rough grinding step, the fine grinding step and the spark-out grinding step), a tolerance of the elapsed time for each machining step, the size abnormality allowable value, the size abnormality detecting time, the allowable amplitude of the oscillatory components in the electric signal from the gage head 16, and the ideal data in a memory 28 of the control part 18.

The grinding machine controller 12 changes the machining speed from a high speed to a low speed according to the signals from the control part 18; e.g., from the rough grinding to the fine grinding and from the fine grinding to the spark-out grinding. Moreover, the grinding machine controller 12 stops the machining and moves back the wheel spindle stock.

FIG. 4 is a block diagram showing the structure of the machine control gage system.

During the machining, the electric signals representing the measurement values of the workpiece 14 are outputted from the gage head 16, and a rectifier circuit 30 rectifies the outputted electric signals. Then, the rectified signals are converted into digital signals by an A/D converter 32, and the converted signals are outputted to the CPU 24. The CPU 24 graphs the record of the measurement results on the color LCD 20 according to the measurement data, and stores the measurement data at regular time intervals (e.g., from 10 msec to 50 msec) in the memory 28.

When the workpiece 14 reaches a predetermined size during the machining, the CPU 24 outputs a signal. The outputted signal is sent to the grinding machine controller 12 and a printer 36 through an input/output circuit (an interface to the exterior) 34.

Figure 5:
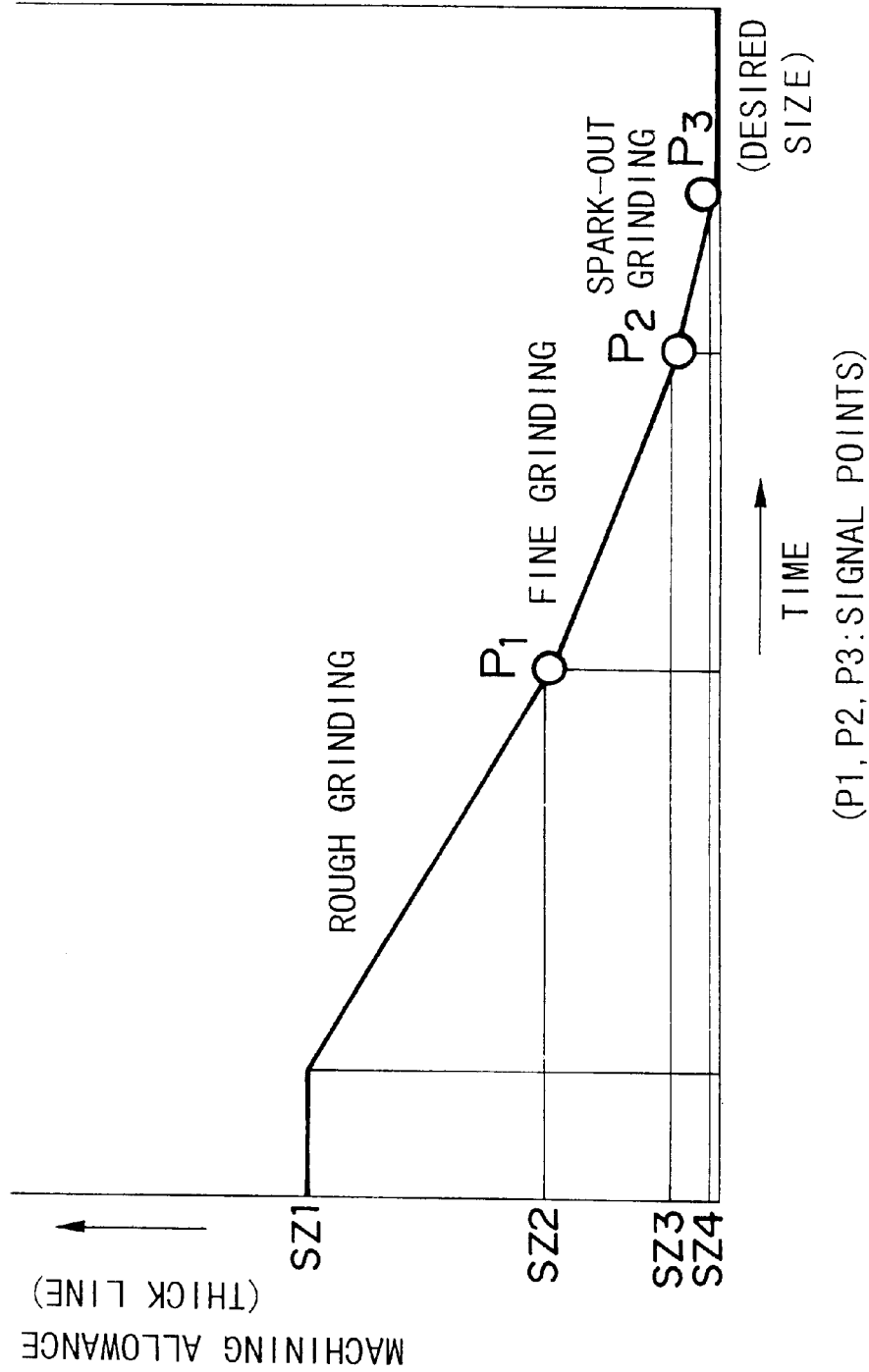
FIG. 5 is a graph showing a relationship between the machining time and the machining allowance in normal grinding.

FIG. 5 is a graph showing an example of the machining allowance in connection with the machining time in the normal machining. When the size of the workpiece 14 measured by the gage head 16 reaches a predetermined first machining allowance (SZ2) (i.e., at $P_1$ in FIG. 5), the control part 18 outputs a first signal to the grinding machine controller 12. The rough grinding is switched to the fine grinding according to the first signal.

When the size of the workpiece 14 reaches a predetermined second machining allowance (SZ3) (i.e., at $P_2$), the control part 18 outputs a second signal to the grinding machine controller 12. The fine grinding is switched to the spark-out grinding according to the second signal.

When the size of the workpiece 14 reaches a predetermined third machining allowance (SZ4) representing the desired size (i.e., at $P_3$), the control part 18 outputs a third signal to the grinding machine controller 12. The wheel spindle stock moves back according to the third signal. Although the measured values may fluctuate in the process of the rough grinding, the machining allowance gradually decreases as the normal machining proceeds in the processes of the fine grinding and the spark-out grinding.

The defective workpieces may be produced under some conditions and found in the examination after the machining. The defective workpieces are produced for the following reasons: the sharpness of a grinding wheel is reduced; dust adheres to a workpiece holding member to displace the axis of the workpiece, an eccentricity of the workpiece due to a shortage of a workpiece holding force, the grinding wheel is inferior, and abrasive grains and chips, etc. adhere to a contact part of the gage head 16. The machine control gage system of this embodiment is capable of detecting the defective machining at first sight to easily determine if the grinding wheel should be dressed, replaced, and the like.

A description will now be given of the operation of the machine control gage system according to this embodiment.

Figure 6:
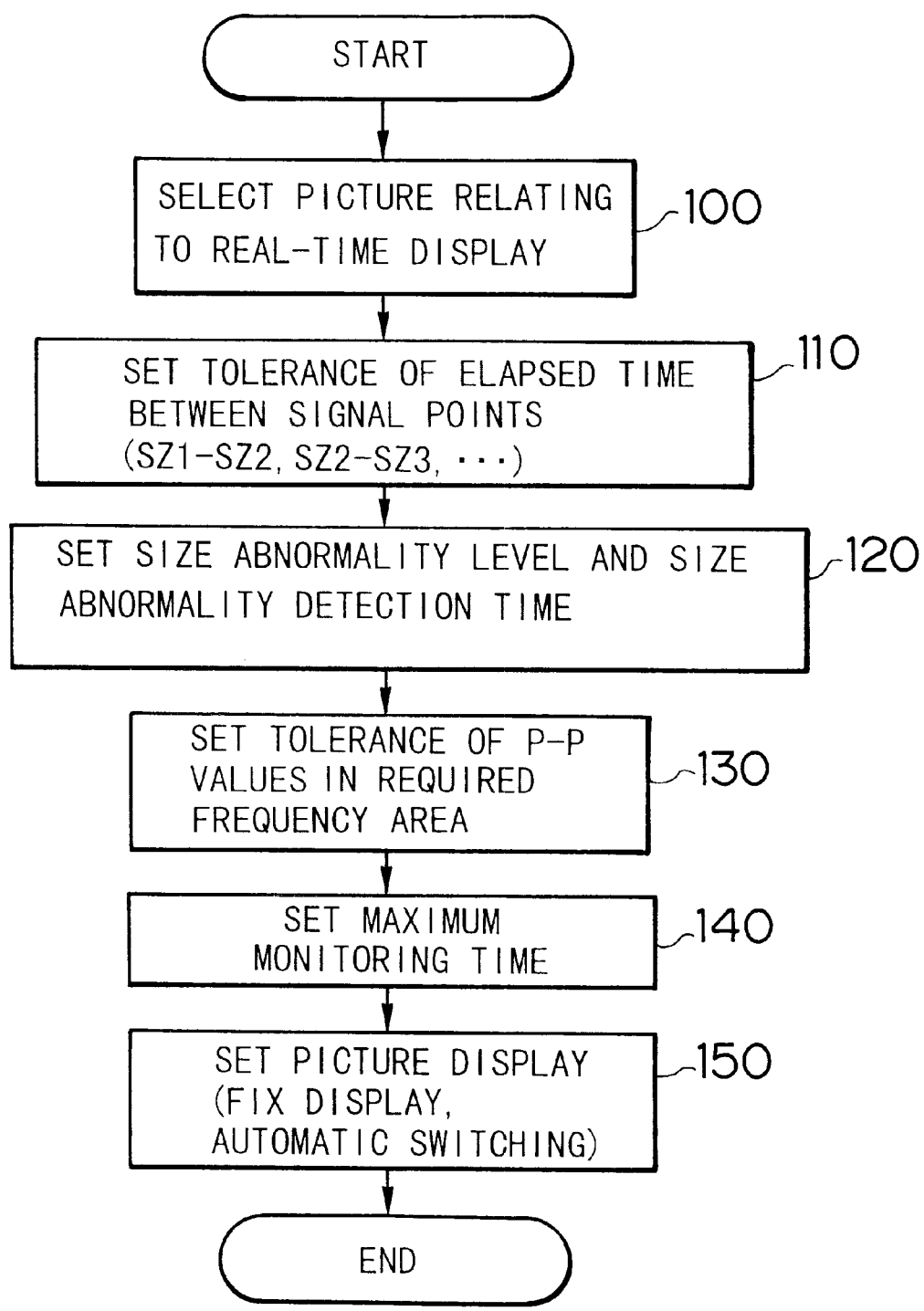
FIG. 6 is a flow chart showing the procedure for initially setting the machine control gage system.

FIG. 6 is a flow chart showing the procedure for initially setting the machine control gage system. The machine control gage system is initially set by operating the buttons 26 on the touch panel 22 of the control part 18.

Figure 7:
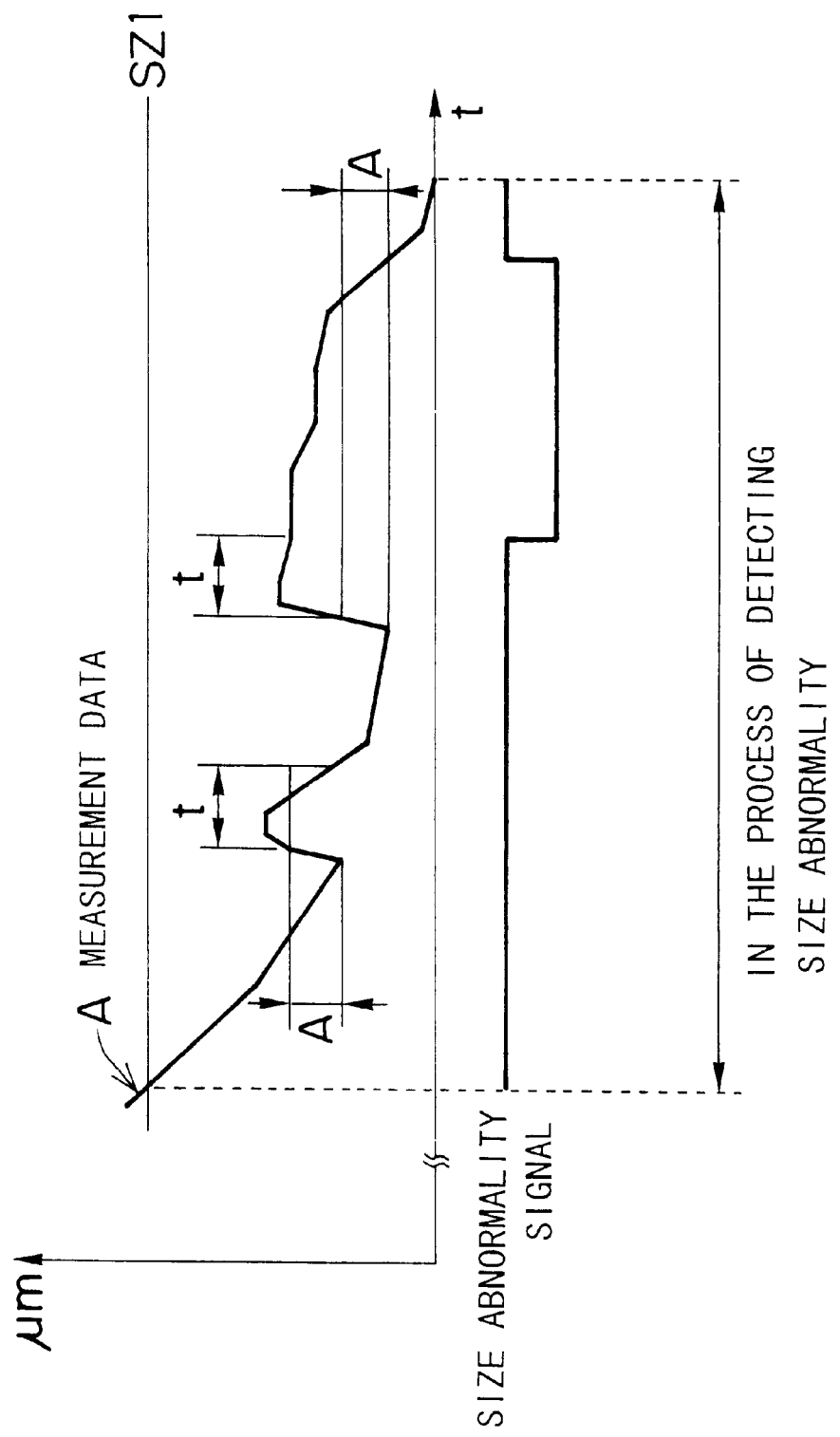
FIG. 7 is a graph showing measurement data for describing a size abnormality level and a size abnormality detecting time.

First, a setting picture relating to the real-time (graph) display is selected (step 100), so that the color LCD 20 can display the setting picture (not shown). Then, the machining elapsed times between signal points (SZ1–SZ2, SZ2–SZ3, SZ3–SZ4) and the tolerances thereof are set (step 110). Then, the size abnormality level (an allowable value) and the size abnormality detecting time (the allowable time) are set (step 120). As shown in FIG. 7, the size abnormality level is a level A, by which the measurement data that is determined to be abnormal is higher than the minimum value of the already-acquired measurement data. The size abnormality detecting time is a time t, in which the measurement data of the level A or more are continuously outputted. The CPU 24 outputs a size abnormality signal if the measurement data of the level A or more are continuously outputted for the time t or longer. The CPU 24 causes the color LCD 20 to display a message indicating the defects, or causes a speaker (not shown) to make an alarm.

Next in FIG. 6, required frequency regions are set. More specifically, the tolerance of the P—P (peak-to-peak) value of the amplitude of the oscillatory components of the electric signal from the gage head 16 is set (step 130). Then, the machining allowance of the workpiece 14 and the ideal data are registered and set.

Then, the maximum monitoring time is set (step 140), and a picture switching timing is set (step 150). In this embodiment, the picture in FIG. 2 is switched to the enlarged picture in FIG. 3 when the machining allowance becomes 30 μm or less. That completes the initial setting of the machine control gage system.

Figure 8:
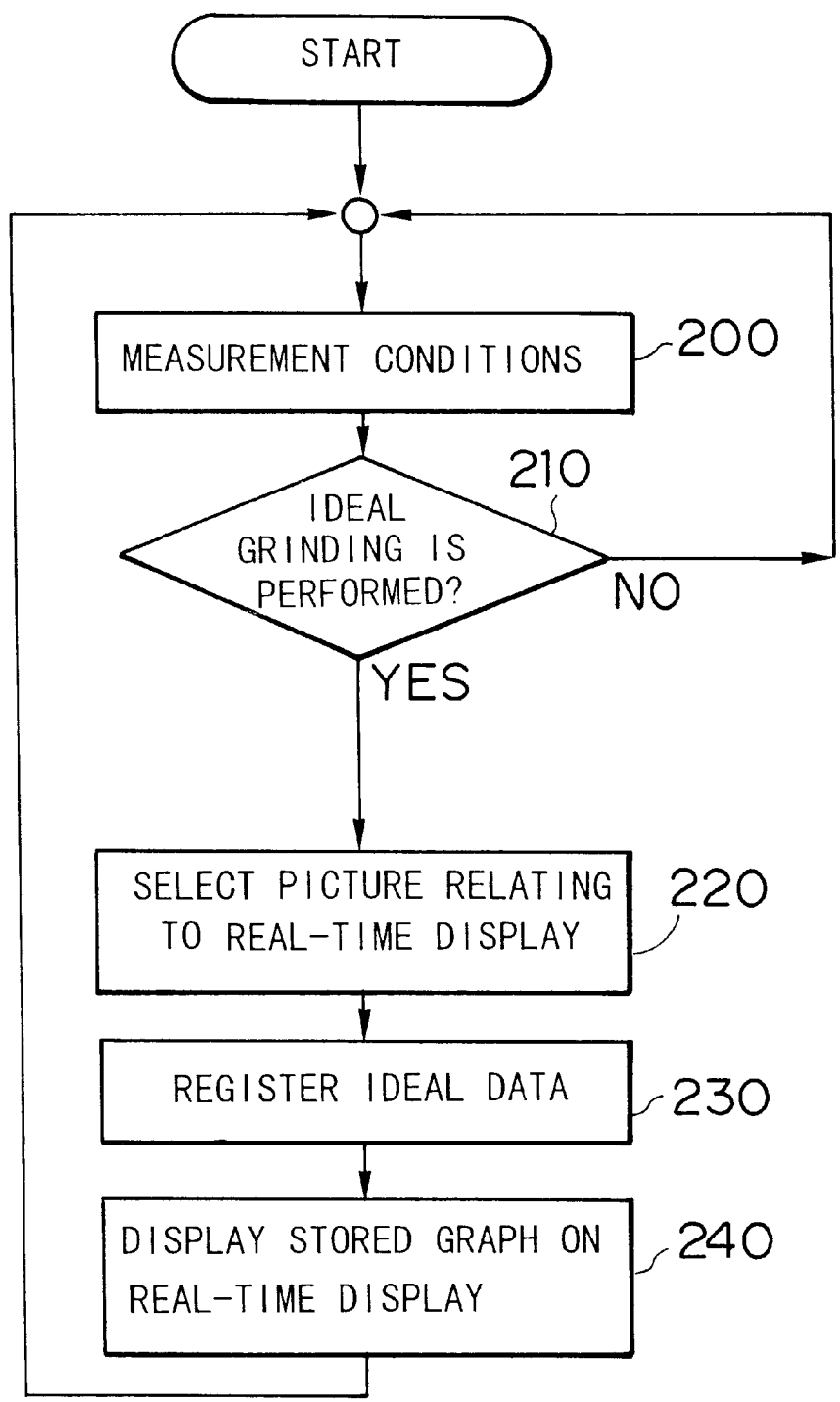
FIG. 8 is a flow chart showing the procedure for registering the record of ideal data and the procedure for displaying the ideal data.

FIG. 8 is a flow chart showing the procedure for registering the record of the ideal data and the procedure for displaying the registered ideal data on the color LCD 20.

Figure 9:
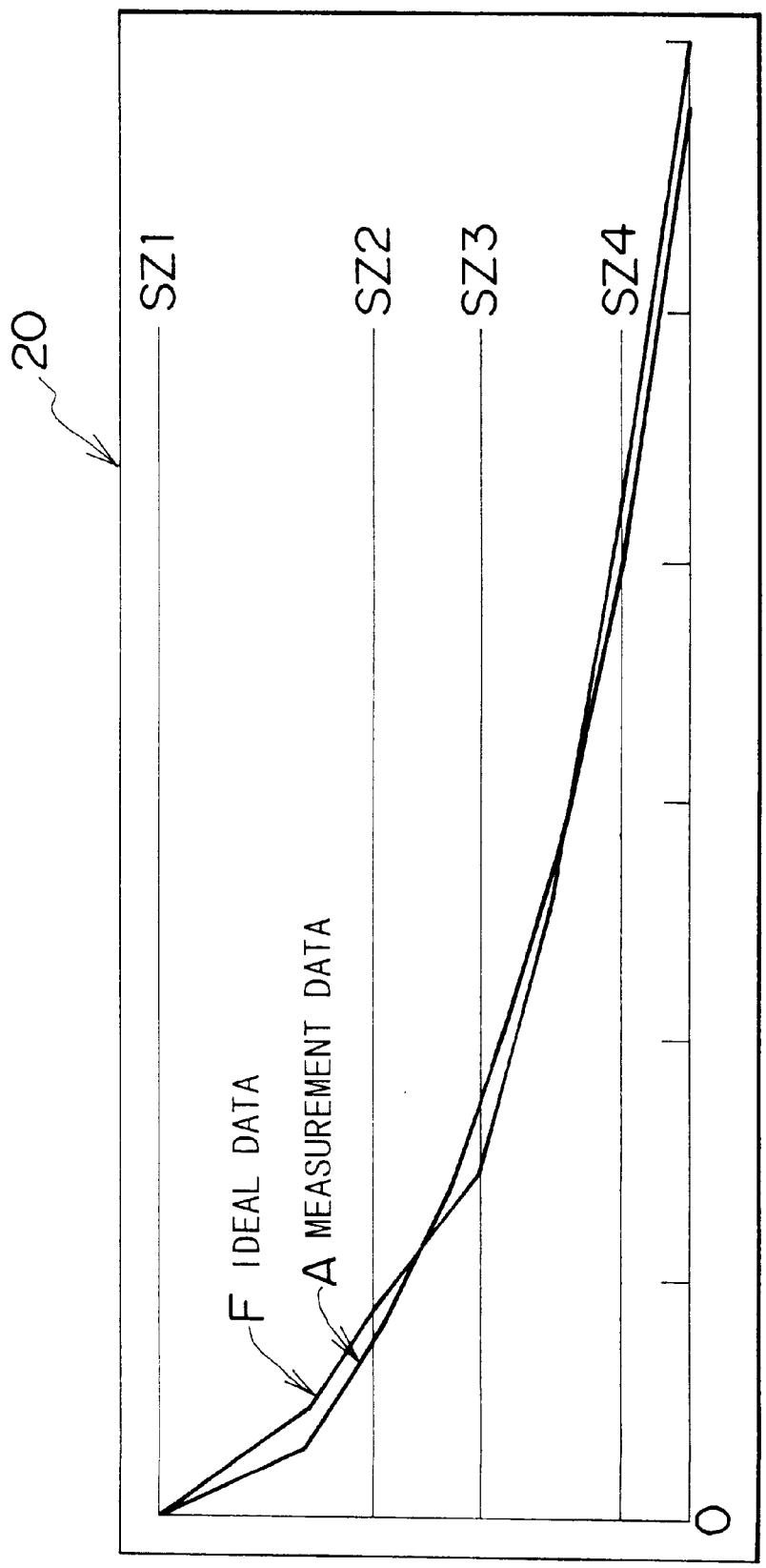
FIG. 9 is a graph showing the record of measurement data and ideal data displayed on the color LCD.

In this embodiment, the record of the ideal data is acquired by using a grinding wheel with sharp cutting edges and by precisely positioning the workpiece. On the measurement conditions (step 200), whether the ideal grinding is performed or not is determined according to the machining status (step 210). If the ideal grinding is performed, the setting picture relating to the real-time (graph) display is selected (step 220). Consequently, the color LCD 20 displays a setting picture (not shown), and the current ideal data is registered to the setting picture (step 230). Then, the registered ideal data is displayed on the color LCD 20 (step 240). Many pieces of such ideal data are acquired for one workpiece, and they are registered. Then, the graph A showing the record of the actual machining data and a graph F showing the record of the registered deal data are displayed during the machining of the workpiece as shown in FIG. 9. Therefore, the operator can easily determine whether a machining defect has occurred, and whether the grinding wheel should be dressed or replaced with reference to only the displacement amount of the graph A with respect to the graph F.

FIG. 10 is a flow chart showing the actual measurement procedure of the machine control gage system.

First, the grinding machine is activated to start grinding the workpiece 14 (step 300), and the gage head 16 is moved to be set at a measurement position (step 310).

Then, the record of the measurement data is graphed and the P—P values of the oscillatory components are bar-graphed on the color LCD 20 of the control part 18. Furthermore, the determination result indicating a machining defect is displayed or outputted when the P—P value exceeds the allowable value (step 320).

After the measurement data passes the signal point SZ1 (step 330), when the measurement data passes the signal point SZ2, in other words, when the rough grinding of the workpiece 14 is completed; the machine control gage system compares the actual elapsed time between the signal points SZ1 and SZ2 with the preset elapsed time including the tolerance between the signal points SZ1 and SZ2 and outputs the comparison result. The determination result is displayed as OK or NG on the color LCD 20 (step 340).

When the machining allowance of the workpiece 14 becomes 30 μm or less, the picture in FIG. 2 showing the graphs A and B is switched to the enlarged picture in FIG. 3 showing the graphs D and E (step 350).

When the measurement data passes the signal point SZ3, in other words, when the fine grinding of the workpiece 14 is completed; the machine control gage system compares the actual elapsed time between the signal points SZ2 and SZ3 with the preset elapsed time including the tolerance between the signal points SZ2 and SZ3 and outputs the comparison result. The determination result is displayed as OK or NG on the color LCD 20 (step 360).

When the measurement data passes the signal point SZ4, in other words, when the spark-out grinding of the workpiece 14 is completed; the machine control gage system compares the actual elapsed time between the signal points SZ3 and SZ4 with the preset elapsed time including the tolerance between the signal points SZ3 and SZ4 and outputs the comparison result. The determination result is displayed as OK or NG on the color LCD 20 (step 370).

That completes the machining of one workpiece by the grinding machine. The enlarged picture in FIG. 3, which is currently displayed on the color LCD 20, can be switched to the picture in FIG. 2 by operating the appropriate button 26 on the touch panel 22 (step 380) in order to graph the entire record of the measurement data. If there is the next workpiece 14, the machined workpiece 14 is replaced with the next workpiece 14 (step 390), and the next workpiece 14 is machined through the above-mentioned steps 300–390.

As shown in FIGS. 2 and 3, the machine control gage system graphs the record of the size of the workpiece 14. It is therefore possible to know that there is an abrupt change or no change in the record of the size of the workpiece during the grinding just by looking at the graph. Therefore, the machine control gage system of this embodiment can easily judge the sharpness of the grinding wheel 10. Thus, the operator without skill can determine when the grinding wheel 10 should be dressed or exchanged.

As shown in FIG. 7, the machine control gage system outputs the abnormality detection signal if the size changes are not within the preset allowable ranges A and t. Thus, the machine control gage system can automatically detect the defective workpieces 14.

The defects result from the decrease in the sharpness of the grinding wheel 10. The grinding time of the grinding wheel 10 with the dull cutting edge is beyond the preset allowable range until the workpiece is ground by a certain feed amount (the machining allowance of about 20 μm), since the grinding wheel 10 does not grind the workpiece and the workpiece 14 is elastically deformed. With the dull cutting edge, the grinding feed amount is decreased during the fine grinding and the spark-out grinding, and consequently, the workpiece 14 is ground by the elastic return force thereof, and the ground amount is beyond the allowable range. To address these problems, the time required for a predetermined change in size is monitored in this embodiment, so that whether the dressing for the grinding wheel 10 is required can be determined automatically.

Furthermore, the machine control gage system of this embodiment monitors the amplitude of the oscillatory components in the electric signals outputted from the gage head 16. The abnormality detection signal is outputted if the amplitude is above the preset allowable value, and it is therefore possible to detect the defects resulting from the eccentricity of the workpiece, the inferior grinding wheel, the abrasive grains, the chips, the chatter, or the like.

As shown in FIG. 9, the machine control gage system of this embodiment displays the ideal (normal) record as well as the record of the measurement data on the currently-machined workpiece, and thus, the sharpness of the grinding wheel 10 can easily be checked in detail.

As set forth hereinabove, according to the machine control gage system of the present invention, the record of changes in the size of the workpiece is graphed on the display, and thus, the sharpness of the grinding wheel can be determined easily. It is therefore possible to determine the dressing time for the grinding wheel and detect the abnormal status of the grinding without a great deal of skill.

Moreover, the machine control gage system of the present invention comprises the first abnormality detector that outputs the abnormality detection signal if the change in the size in a predetermined period is beyond the preset allowable range. Thus, the defective workpieces can be detected automatically.

The machine control gage system of the present invention further comprises the second abnormality detector that outputs the abnormality detection signal if the amplitude of the oscillatory components of the electric signal outputted from the measuring device exceeds the preset allowable value. It is therefore possible to automatically detect the defects resulting from the eccentricity of the workpiece, the inferior grinding wheel, the abrasive grains, the chips, the chatter, or the like.

In addition, the record of changes in the size of the workpiece in the normal machining is displayed with the record of changes in the size of the currently-machined workpiece. Therefore, the sharpness of the grinding wheel can easily be determined in detail.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A machine control gage system, comprising:
   a measuring device that detects changes in the size of a workpiece ground by a machine tool, and outputs electric signals representing the changes in the size of the workpiece;
   a controller that monitors the changes in the size of the workpiece in accordance with the electric signals outputted from the measuring device, and outputs a signal to control the machine tool when the workpiece reaches a predetermined size;
   a display that displays a graph showing a record of the changes in the size of the workpiece in accordance with the electric signals outputted from the measuring device; and
   a setting mechanism for setting a switch value so that a picture in the display showing a record of actual measurement data is switched to an enlarged picture, and switches the picture from the display to the enlarged picture when the measurement data is below the switch value.

2. The machine control gage system as defined in claim 1, further comprising a first abnormality detector that monitors the changes in the size of the workpiece in accordance with the electric signals outputted from the measuring device, and outputs a first abnormality detection signal when a time elapsed for a predetermined change in the size of the workpiece is out of a predetermined allowable range.

3. The machine control gage system as defined in claim 1, wherein the display displays a graph showing a record of the changes in the size of the workpiece that is normally ground.

4. A machine control gage system comprising:
   a measuring device that detects changes in the size of a workpiece ground by a machine tool, and outputs electric signals representing the changes in the size of the workpiece;
   a controller that monitors the changes in the size of the workpiece in accordance with the electric signals outputted from the measuring device, and outputs a signal to control the machine tool when the workpiece reaches a predetermined size;
   a display that displays a graph showing a record of the changes in the size of the workpiece in accordance with the electric signals outputted from the measuring device; and
   a second abnormality detector that sets an area of amplitude components of an electric signal outputted from the measuring device, monitors an amplitude of oscillatory components of the electric signals outputted from the measuring device, and outputs an abnormality detection signal when the amplitude exceeds a predetermined allowable value.

* * * * *